(12) United States Patent
Sakuragi et al.

(10) Patent No.: US 6,218,760 B1
(45) Date of Patent: Apr. 17, 2001

(54) BRUSHLESS MOTOR

(75) Inventors: Katsunori Sakuragi; Hideshi Fukutani; Keisuke Ueda, all of Tottori (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/468,310

(22) Filed: Dec. 21, 1999

(30) Foreign Application Priority Data

Dec. 22, 1998 (JP) .................................................. 10-364540

(51) Int. Cl.$^7$ ..................................................... H02K 21/12
(52) U.S. Cl. ........................ 310/254; 310/49 R; 310/258
(58) Field of Search ................................... 310/156, 254, 310/216, 264, 269, 51, 49 R; 29/596–598; 360/99.08, 99.04, 99.07, 98.09

(56) References Cited

U.S. PATENT DOCUMENTS

| 3,860,843 | * | 1/1975 | Kawasaki et al. ................ 310/67 R |
| 4,575,652 | * | 3/1986 | Gogue ................................. 310/49 R |
| 5,610,464 | * | 3/1997 | Asano et al. ........................... 310/156 |
| 5,798,887 | * | 8/1998 | Yoshida et al. ................... 360/99.08 |
| 5,990,592 | * | 11/1999 | Miura et al. ........................... 310/156 |

FOREIGN PATENT DOCUMENTS

| 7-31085 | 1/1995 | (JP) . |
| 2636108 | 4/1997 | (JP) . |

* cited by examiner

*Primary Examiner*—Tran Nguyen
(74) *Attorney, Agent, or Firm*—Wenderoth, Lind & Ponack, L.L.P.

(57) ABSTRACT

A brushless motor includes (a) a rotor magnet having plural magnetic polarities and (b) a stator core facing the rotor magnet via an annular space. The stator core has plural teeth wound by coils, and a teeth width ranges from not less than 1.7 mm to not more than 2.2 mm, or an outer diameter of the rotor core vs. the teeth width ranges from not less than 8 to not more than 12. This structure allows the brushless motor to rotate with less vibrations, lower noise and lower current consumption.

20 Claims, 6 Drawing Sheets

$$\text{TORQUE RIPPLE RATIO (\%)} = \frac{\text{Tmax} - \text{Tmin}}{\text{Tmax}} \times 100$$

BRUSHLESS MOTOR

FIELD OF THE INVENTION

The present invention relates to a brushless motor for driving at least one media-disc such as a magnetic disc, more specifically, it relates to a brushless motor having less torque ripples, cogging and iron loss, and yet having a better torque constant by improving a shape of a stator-core.

BACKGROUND OF THE INVENTION

The brushless motor has been widely used in office automation devices and audio-video devices. Among various brushless motors, a polygon-mirror-scanner-motor employed in laser copying machines, a spindle-motor employed in magnetic-disc-driving-devices are directed to the higher-rotating-speed. The rotating speed of the polygon-mirror-scanner-motor is over 20,000 rpm, and that of the spindle-motor is as high as 12,000 rpm because a memory capacity has been increased and the higher rotating speed has been required.

The higher rotating speed entails the greater vibrations due to powering a motor coil and cogging, and these increased vibrations involve other problems. Regarding noises of the motor, the higher rotating speed induces the motor to rotate in an imbalance manner, which produces additional vibrations. Further, the higher rotating speed increases motor-loss thereby boosting the power consumption. The major loss in power consumption comprises windage loss, axial loss, iron loss and the like. The iron loss among others has two components, i.e. hysteresis loss and eddy-current-loss. In general, the hysteresis loss is proportionate to a number of rotations (more specifically, a current-frequency in the motor coil), and the eddy-current-loss is proportionate to a square of the number of rotations (more specifically, the current-frequency in the motor coil). The eddy-current-loss is thus increased at the greater number of rotations, so that the iron loss takes a greater part of the entire loss.

Smooth rotating is required for the motor to reduce vibration. To achieve this, it is necessary to lower the cogging and eliminate torque ripples. Skew magnetizing to a rotor magnet or laminating a plurality of core pieces forming a stator core is a regular measures to lower the cogging and eliminate the torque ripples.

On the other hand, the following two methods are employed to reduce iron loss:

1. Decreasing the iron loss of the stator core per se by replacing silicon-steel-plates which are laminated to the stator core with the plates having less iron loss, or by annealing the stator core; or
2. Decreasing a number of magnetized polarities thereby lowering the frequency of current running through the motor coil.

Conventional problems due to skewing provided to the rotor magnet and stator core are discussed hereinafter.

When the skewing is provided to the rotor magnet and stator core, torque ripples and cogging decrease; however, the motor efficiency as well as torque constant is lowered. In recent years, the market strongly demands a smaller device with the less vibrations and the lower noise and yet the device should keep the same torque-constant and the motor-efficiency as those of an original device. To achieve this request, the torque ripples and cogging of the motor per se should be reduced.

Figure 5:
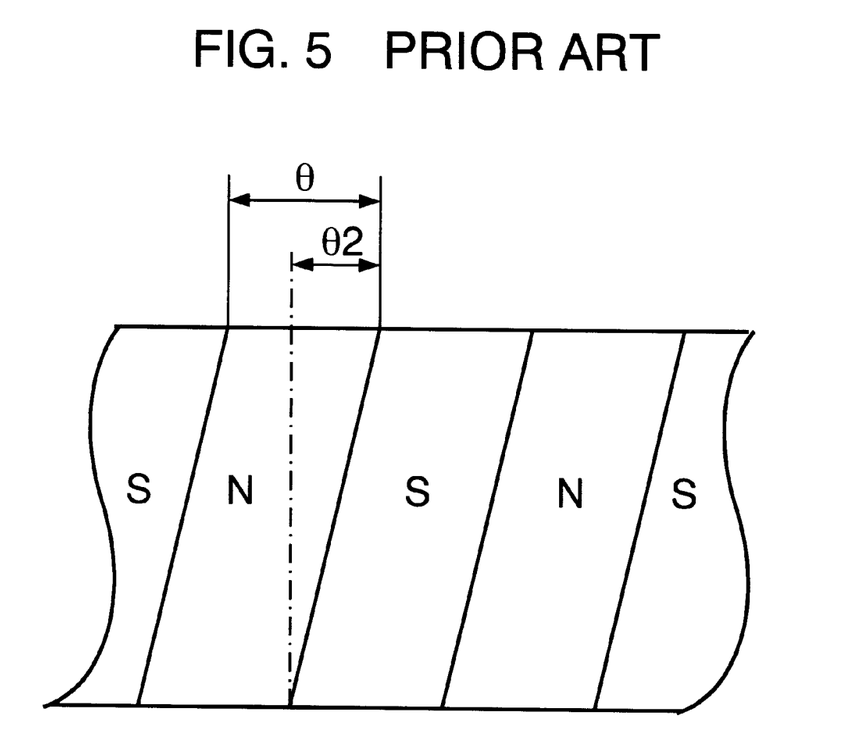
FIG. 5 illustrates a method of skew magnetizing to the rotor magnet of a conventional motor.

Japanese Patent Examined Publication No. 2636108 shown in FIG. 5 already disclosed a method how to reduce cogging by providing skewed magnetization to the rotor magnet.

In this prior art shown in FIG. 5, the following formula is established:

$$(76°/n) \times 0.8 \leq \theta 2 \leq (76°/n) \times 1.2$$

where
  θ2=skew angle;
  2n=a number of magnet poles of the rotor magnet;
  3n=a number of slots of the stator core.

The structure embodied by this formula allows the skew angle at magnetizing the rotor-magnet to be set so that the cogging and torque ripples are reduced without lowering the motor efficiency.

This prior art is effective only when a motor has some dimensional room, thus the prior art is difficult to apply to the motor to be smaller and thinner. In particular, when the motor becomes thinner and uses only a small number of core layers or the height of rotor magnet is too low to measure, this skewed magnetization produces no effects. In this case, neither lowering the cogging nor decreasing the torque ripples is expected, and the motor characteristics Kt (the torque constant) is aggravated.

The problems accompanying the conventional method of reducing the iron loss are described hereinafter.

A plurality of core pieces, i.e. silicon steel plates, are replaced with the plates having the less iron loss, or the plates undergo annealing. These are usual methods for decreasing the iron loss; however, these methods incur cost increase, and the annealed material is vulnerable to corrosion. An appropriate surface treatment is thus required.

Another method is disclosed in Japanese Patent Application Non-examined Publication No. H07-31085 shown in FIG. 6. The method is to construct the stator core not by laminating a plurality of core pieces but by unitarily forming the stator core, so that the iron loss is reduced.

Figure 6A:
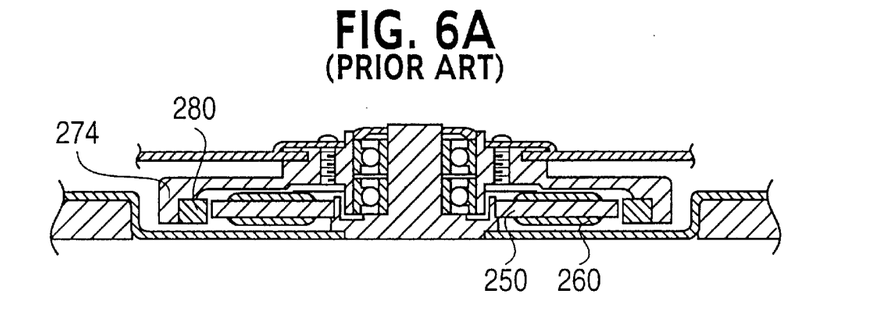
FIG. 6A is a cross section of another conventional motor.
Figure 6B:
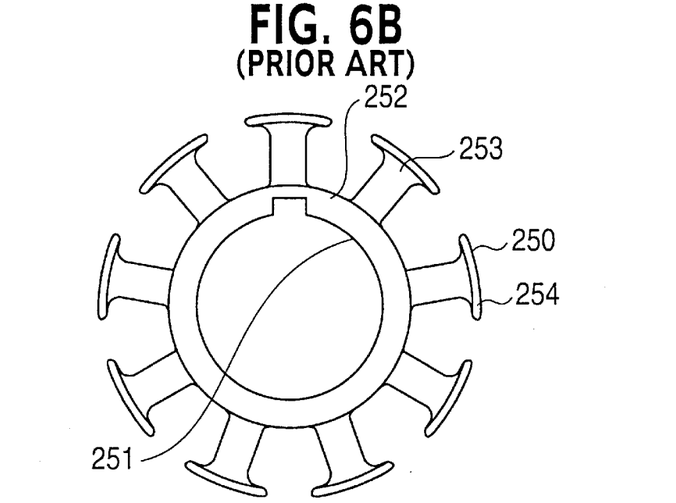
FIG. 6B is a plan view of a stator core of the motor shown in FIG. 6A.
Figure 6C:
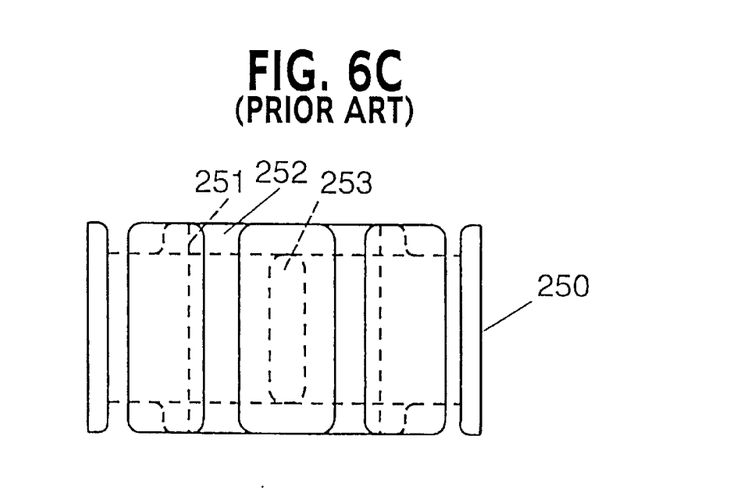
FIG. 6C is a side view of the stator core of the motor shown in FIG. 6A.

FIG. 6A is a cross section of a conventional motor, FIG. 6B is a plan view of a stator core of the conventional motor, and FIG. 6C is a side view thereof.

In FIG. 6A, teeth 253 of stator core 250 are wound by coils 260, and rotor magnet 280 is disposed around stator core 250 via an annular space. Magnet 280 is fixed to depending 274 of the rotor.

In FIGS. 6B and 6C, stator core 250 comprises the following elements:
  (a) hole 251 for the stator core to be fixed;
  (b) annular base 252 provided around hole 251; and
  (c) teeth 253 protruding from an outer wall of base 252 in a radius direction and being wound by coils 260. End plates 254 protruding in the axial direction are formed on each tip of respective teeth 253.

Stator core 250 comprises base 252 and teeth 253. These elements undergo a press-process and a machining process thereby forming the stator core, and then the stator core undergoes annealing process. This method, i.e. forming the stator core not by laminating a plurality of core pieces but by forming unitarily the elements into the stator core before undergoing the annealing process, can reduce the iron loss.

This method, however, requires a number of processing steps such as press-process, machining-process, and thus produces unstable quality and no advantage of cost. Indeed this method can improve a saturated magnetic flux density; however, it produces only a little effect for reducing the iron loss. This method is difficult to apply to a tall-height motor, and aggravates the motor characteristics Kt if this method is employed.

SUMMARY OF THE INVENTION

The present invention addresses the problems discussed previously, and has the following two objectives:

1. To achieve a method solving the problems applicable with ease to any sizes of motors including a small and a thin sizes.
2. To realize a brushless motor with less torque ripples, cogging and iron loss as well as a better torque constant of motor characteristics.

The brushless motor of the present invention comprises the following elements:

(a) a rotor magnet including a plurality of magnetic poles; and
(b) a stator core facing the rotor magnet via air gap.

The stator core has a plurality of teeth wound by coils, and the respective teeth widths range from 1.7 mm to 2.2 mm inclusive both ends.

A ratio of outer diameter of the stator core vs. tooth width ranges from 8 to 12 inclusive both ends.

The structure discussed above allows the stator core to be produced not by complicated processes but by a press-process with ease and at a high accuracy. This structure also achieves less vibrations and low noise by reducing sources of vibrations such as cogging and torque ripples.

DETAILED DESCRIPTION OF THE INVENTION

Exemplary embodiments of the present invention are demonstrated hereinafter with reference to the accompanying drawings.

Exemplary Embodiment 1

Figure 1:
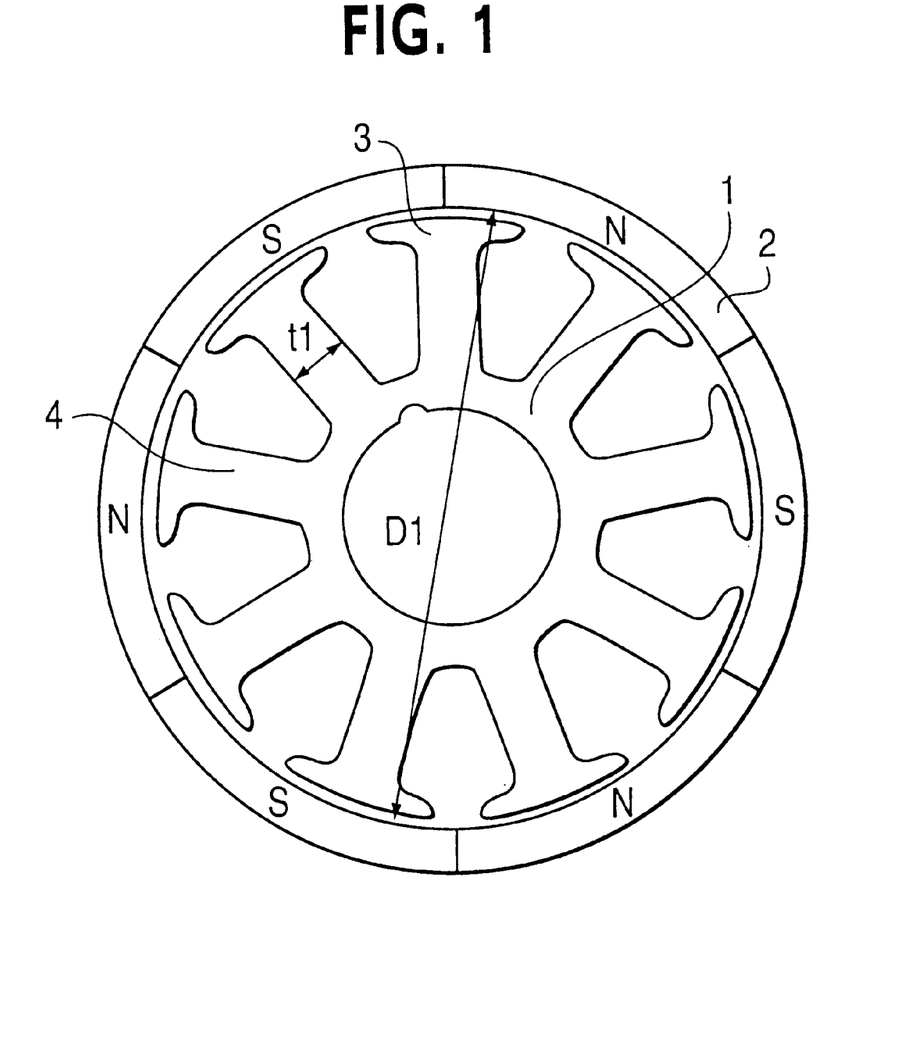
FIG. 1 is an enlarged view of an essential part of a motor (having 6 magnetic poles and 9 slots) in accordance with a first exemplary embodiment of the present invention.

FIG. 1 is an enlarged view of an essential part of a motor, having 6 magnetic poles and 9 slots, in accordance with the first exemplary embodiment of the present invention.

In FIG. 1, a basic construction of the motor is the same as that of a conventional motor, detailed description is thus omitted here.

Stator-core 1 and rotor-magnet 2 shown in FIG. 1 are detailed hereinafter.

Magnet 2 is made from neodymium-bond-magnet (NdFeB bond magnet) and has six magnetic polarities disposed circumferentially. Stator core 1 is unitarily formed with nine teeth radially arranged on the outer rim of stator core 1, and faces to magnet 2 via annular space. Teeth 4 extending radially to stator-core-sections 3 situated on their tips, and the stator core-sections 3 extend circumferentially. Teeth 4 are wound by coils (not shown). An outer diameter of stator core 1 is denoted with "D1", and a width of teeth 4 is denoted with "t1".

Figure 2:
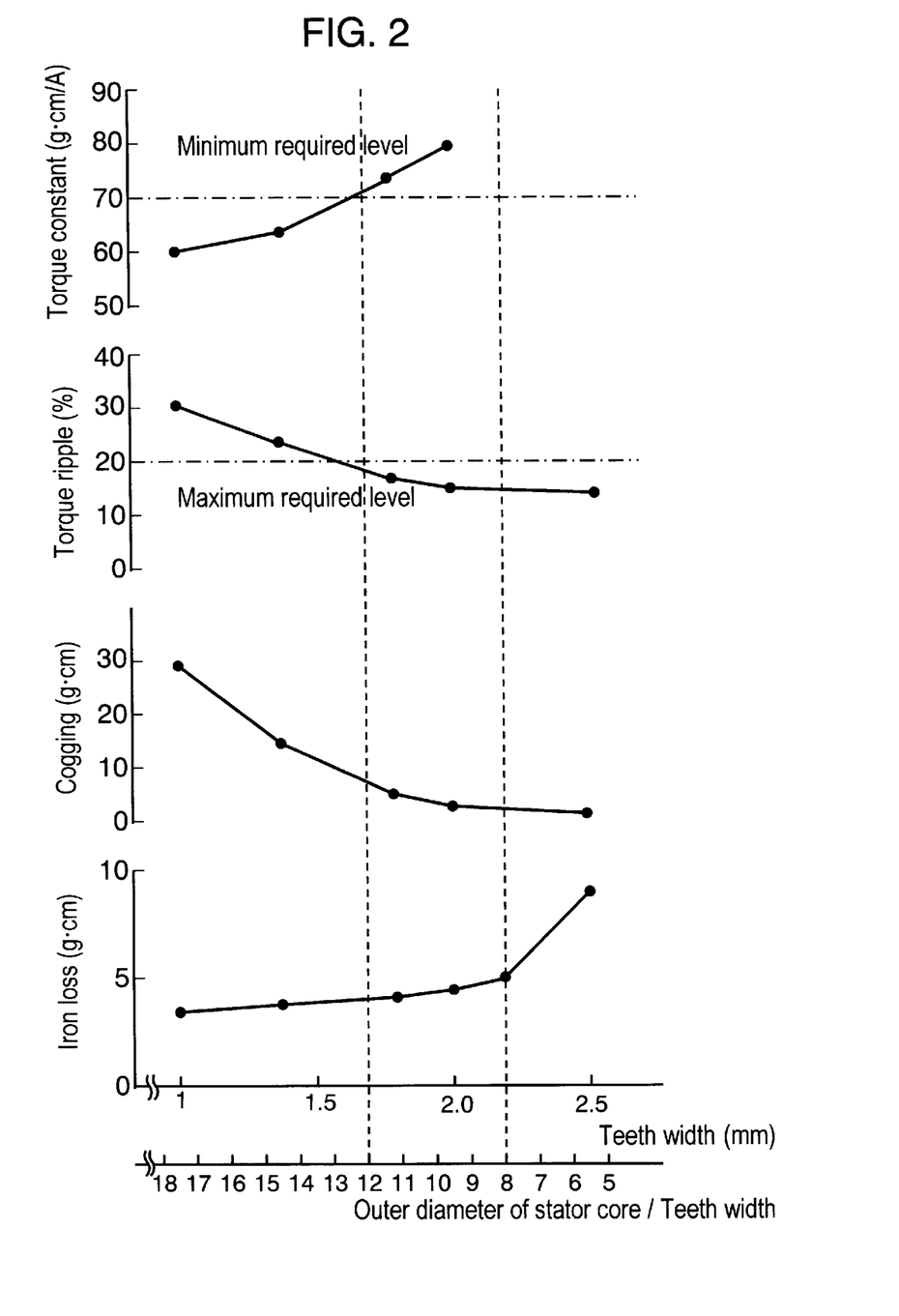
FIG. 2 illustrates characteristics of torque constant Kt, torque ripples, cogging and iron loss (converted into a torque value) at changing the tooth width of the motor in accordance with the first exemplary embodiment of the present invention.

FIG. 2 illustrates characteristics of torque constant Kt, torque ripples, cogging and iron loss at 10,000 rpm (converted into a torque value) at changing the tooth width t1 of the motor in accordance with the first exemplary embodiment of the present invention.

The motor having these characteristics is a brushless motor employed in 3.5" magnetic-disc driving device. The motor is structured in the following way: The motor includes a hollow cylindrical hub, on which at least one magnetic disc is mounted, and the rotor magnet is fixedly mounted on an inner wall of the hub. The outer diameter of the rotor magnet is smaller than the diameter of the hub at which the disc is mounted. The stator core is disposed around the magnet via annular space. As such, the motor is situated inside of the hub, namely it is an in-hub type motor.

In this embodiment, outer diameter D1 of stator core 1 is not more than 20 mm, a number of magnetic polarities is six (6), and a number of slots of stator core 1 is nine (9).

Figure 3:
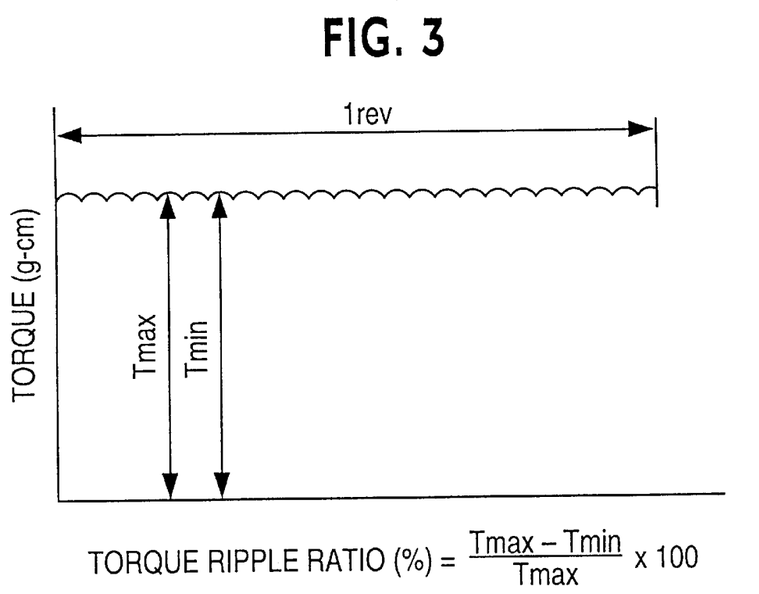
FIG. 3 illustrates synthesized torque-ripple-wave of the motor in accordance with the first exemplary embodiment of the present invention.

As shown in FIG. 2, the measuring results tell that motor constant "Kt", torque ripples and cogging become favorable to users at the greater teeth width "t1", however, the iron loss increases, which is unfavorable to the users. The torque ripples shown in FIG. 2 are synthesized from each torque generated in respective phases as shown in FIG. 3, and is expressed in the following equation:

$$\text{Torque ripples} = (T_{max} - T_{min})/T_{max} \times 100$$

Based on the measuring results shown in FIG. 2, teeth width "t1" is set in the range of 1.7 mm–2.2 mm and the ratio of D1/t1 is set in the range of 8–12 under the condition that the iron loss is a permissible range and other characteristics are satisfied.

Setting teeth width "t1" and the ratio of "D1"(outer diameter of the stator core) vs. "t1" as discussed above allows the respective characteristics, i.e. motor constant "Kt", torque ripples, cogging and iron loss, to be optimally designed.

If teeth width "t1" is narrowed less than 1.7 mm or the ratio of D1/t1 is increased greater than 12, stator core 1 is saturated by magnetic flux at its teeth 4, and a sign-waveform of an inductive voltage generated by the coil is distorted. Motor constant "Kt", torque ripples and cogging are optimized when the inductive voltage generated by the coil forms a sign-waveform, however, the distorted sign-waveform aggravates those characteristics.

On the contrary, if teeth width "t1" is widened greater than 2.2 mm or the ratio of D1/t1 is decreased less than 8, space for winding is eliminated and a required motor constant "Kt" is not satisfied. Further, eddy-current-loss increases at both of the tip of teeth 4 and stator-core-section 3 extending circumferentially on respective surfaces of laminated core pieces thereby incurring greater iron loss.

In general, rotor magnet can be made from various materials ranging from rare-earth magnet to plastic magnet; however, they produce their own maximum-energy-product respectively. For instance, the maximum-energy-product of neodymium-bond-magnet, i.e. "BH max" ranges 8–11 MGOe. This first embodiment can produce advantages further effectively when such a maximum-energy-product corresponding to NdFeB bond magnet is available.

When neodymium-bond-magnet is used as a material of the rotor magnet and the width of annular space is set between 0.2 mm and 0.35 mm inclusive both ends, the density of magnetic flux in the annular space between the rotor magnet and the stator core ranges from 4500 to 5000 gauss. In this condition, motor constant "Kt", torque ripples, cogging and iron loss can take favorable values to the better performance and they are well balanced with each other.

When rare-earth-magnet or plastic magnet is used as a material of the rotor magnet, the width of annular space is set so that the magnetic flux density can take a value between 4500–5000 gauss. As a result, the same advantage can be expected.

Further, if a number of magnetic polarities of the rotor magnet and a number of slots are changed, the same advantage can be obtained by adjusting the magnetic flux density to take a value between 4500–5000 gauss.

A number of rotations of the motor is preferably not less than 7200 rpm because the iron loss increases at a greater number of rotations (more specifically, the frequency of current running in the coil), and the iron loss takes a greater part of entire loss when the motor is driven at the higher speed.

The present invention is applicable to any diameters of stator cores, and produces its advantage more effectively in the motor of which stator core measures not more than 50 mm—where neodymium-bond-magnet can be used as a material of the rotor magnet—as well as in the brushless motor—needed to be small, thin and high powered—employed in 3.5" or smaller size magnetic-disc-driving devices.

The first exemplary embodiment as discussed above proves that an accurate brushless motor having excellent characteristics mentioned above can be produced not by complicated processes but by a simple press-process with ease. Further, no special tools and methods are required in the assembly line of the motors, and less vibrations, lower noise as well as less power consumption are achieved in a device to which the motor is mounted.

Exemplary Embodiment 2

Figure 4A:
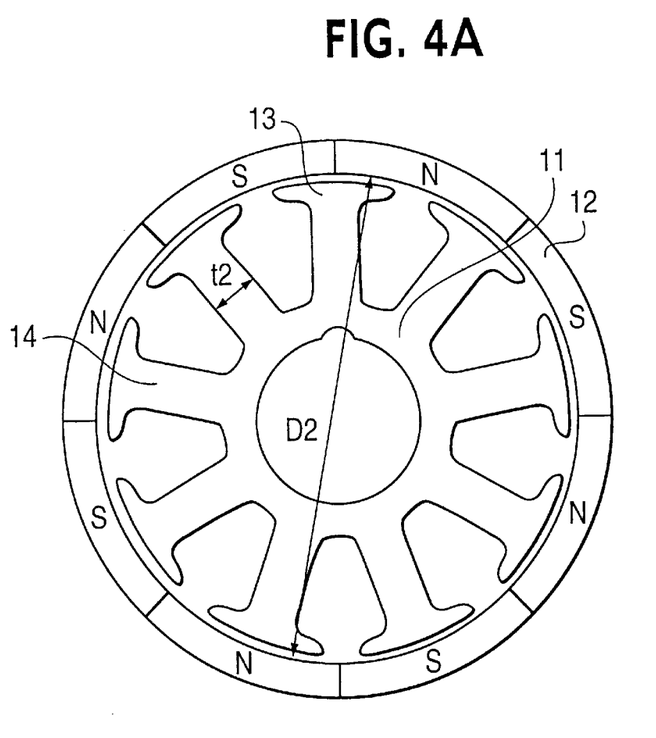
FIGS. 4A–4B are enlarged views of an essential part of a motor (having 8 magnetic poles and 9 slots) in accordance with a second exemplary embodiment of the present invention.
Figure 4B:
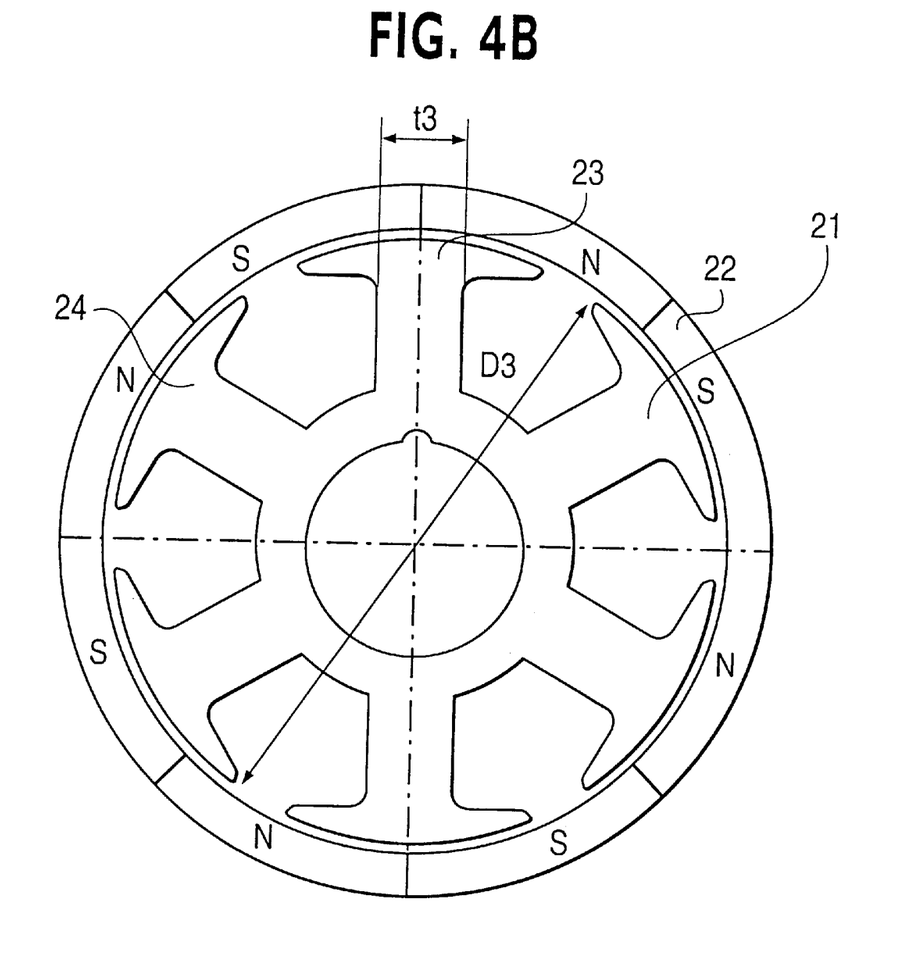

FIG. 4 is an enlarged view of an essential part of a motor, having 8 magnetic poles and 9 slots, in accordance with the second exemplary embodiment of the present invention.

In FIG. 4, rotor magnet 12 is made from neodymium-bond-magnet and includes eight magnetic polarities circumferentially. Stator core 11 is unitarily formed with nine pieces of stator-core-sections 13 extending circumferentially, and faces to magnet 12 via an annular space.

Stator-core-sections 13 have teeth 14 which are wound by coils (not shown). An outer diameter of stator core 11 is denoted with "D2", and a width of teeth 14 is denoted with "t2". The same advantages proven in the first embodiment can be obtained by this structure discussed above.

The present invention is not limited to the first and second embodiments discussed above, and various modifications may be made in the details within the scope and range of equivalents of claims and without departing from the spirit of the invention.

For instance, in the case of setting a number of magnetic polarities of the rotor magnet "eight"(8), and a number of slots of the stator core "six"(6), the teeth width or ratio of outer diameter of the stator core vs. the teeth width is set as follow thereby allowing the magnetic-flux-density in the annular space to take a value between 4500–5000 gauss and then obtaining the same advantages as discussed previously.

$$\text{Teeth width} = \sqrt{(9 \text{ slots}/6 \text{ slots})} \times (1.7-2.2 \text{ mm}) = 2.1-2.7 \text{ mm}$$

or $$\text{Outer diameter/teeth width} = (8-12)/\sqrt{(9 \text{ slots}/6 \text{ slots})} = 6.5-9.8$$

As discussed above, the brushless motor of the present invention effects the following advantages by setting the teeth width of the stator core at a given range or setting the ratio of outer diameter of the stator core vs. the teeth width at a given range:

An accurate brushless motor can be constructed not by complicated or special processes but by simple press-process with ease. In the brushless motor, vibrations sources such as cogging and torque ripples are reduced thereby achieving the motor with less vibrations and lower noises. The noises can be lowered by not less than 3 dB of switching noises. The iron loss can be reduced and stabilized at a reduced level, thereby decreasing the current consumption. The motor employing neodymium-bond-magnet, in particular, produces effectively those advantages at 7200 rpm or more.

Further, a motor employed in a 3.5" magnetic-disc-driving device effects the following advantages in addition to the ones discussed above: Silicon-steel plates with less iron loss are used for forming the stator core so that the iron loss can be reduced down to not more than 3 gcm (converted value in an actual torque) at 10,000 rpm. Cogging can be also lowered down to not more than 1 g cm by optimizing the slot width. The torque ripples can be lowered down to not more than 10% by controlling magnetizing waveform.

As such, the present invention can achieve the inexpensive brushless motor with less vibrations, lower noises and current-consumption by forming the stator core as discussed above.

The brushless motor of the present invention is applicable to not only magnetic-disc-driving devices but also to other media-disc-driving devices, other office automation devices as well as audio video devices. The brushless motor of the present invention can be used in such wide range of products and its advantages thus greatly contributes to industrial development.

What is claimed is:

1. A brushless motor comprising:
   a rotor magnet having a plurality of magnetic polarities; and
   a stator core facing said rotor magnet via an annular space;
   wherein said stator core has a plurality of teeth wound by coils, and a width of respective said teeth ranges from not less than 1.7 mm to not more than 2.2 mm.

2. The brushless motor as defined in claim 1, wherein said rotor magnet has six magnetic polarities, and said stator core has nine slots.

3. The brushless motor as defined in claim 1, wherein said rotor magnet has eight magnetic polarities, and said stator core has nine slots.

4. The brushless motor as defined in claim 1, wherein said rotor magnet comprises a neodymium-bond-magnet.

5. The brushless motor as defined in claim 1, and further comprising a hub to which at least one media-disc is to be mounted, wherein said rotor magnet has a smaller outer diameter than a diameter of said hub to which the media-disc is to be mounted.

6. The brushless motor as defined in claim 1, wherein a magnetic-flux-density to be produced in the annular space between said rotor magnet and said stator core ranges from not less than 4,500 gauss to not more than 5,000 gauss.

7. A brushless motor comprising:

a rotor magnet having a plurality of magnetic polarities; and a stator core facing said rotor magnet via an annular space;

wherein said stator core has a plurality of teeth wound by coils, and a ratio of an outer diameter of said stator core to a width of respective said teeth ranges from not less than 8 to not more than 12.

8. The brushless motor as defined in claim 7, wherein said rotor magnet has six magnetic polarities, and said stator core has nine slots.

9. The brushless motor as defined in claim 7, wherein said rotor magnet has eight magnetic polarities, and said stator core has nine slots.

10. The brushless motor as defined in claim 7, wherein said rotor magnet comprises a neodymium-bond-magnet.

11. The brushless motor as defined in claim 7, and further comprising a hub to which at least one media-disc is to be mounted, wherein said rotor magnet has a smaller outer diameter than a diameter of said hub at which the media-disc is to be mounted.

12. The brushless motor as defined to be produced in claim 7 wherein a magnetic-flux-density in the annular space between said rotor magnet and said stator core ranges from not less than 4,500 gauss to not more than 5,000 gauss.

13. A brushless motor comprising:

a rotor magnet having a plurality of magnetic polarities; and a stator core facing said rotor magnet via an annular space;

wherein said stator core has a plurality of teeth wound by coils, and a width of respective said teeth ranges from not less than 2.1 mm to not more than 2.7 mm.

14. The brushless motor as defined in claim 9 wherein a magnetic-flux-density to be produced in the annular space between said rotor magnet and said stator core ranges from not less than 4,500 gauss to not more than 5,000 gauss.

15. The brushless motor as defined in claim 13, wherein said rotor magnet has eight magnetic polarities, and said stator core has six slots.

16. A brushless motor comprising:

a rotor magnet having a plurality of magnetic polarities; and a stator core facing said rotor magnet via an annular space;

wherein said stator core has a plurality of teeth wound by coils, and a ratio of an outer diameter of said stator core to a width of respective said teeth ranges from not less than 6.5 to not more than 9.8.

17. The brushless motor as defined in claim 16, wherein said rotor magnet has eight magnetic polarities, and said stator core has six slots.

18. The brushless motor as defined in claim 17 wherein a magnetic-flux-density to be produced in the annular space between said rotor magnet and said stator core ranges from not less than 4,500 gauss to not more than 5,000 gauss.

19. A brushless motor comprising:

a rotor magnet having a plurality of magnetic polarities; and a stator core facing said rotor magnet via an annular space;

wherein said stator core has a plurality of teeth wound by coils, wherein a magnetic-flux-density to be produced in the annular space between said rotor magnet and said stator core is adjustable within a range from not less than 4,500 gauss to not more than 5,000 gauss by defining a width of respective teeth within a given range.

20. A brushless motor comprising:

a rotor magnet having a plurality of magnetic polarities; and a stator core facing said rotor magnet via an annular space;

wherein said stator core has a plurality of teeth wound by coils, wherein a magnetic-flux-density in the annular space between said rotor magnet and said stator core is adjustable within a range from not less than 4,500 gauss to not more than 5,000 gauss by defining a ratio of an outer diameter of said stator core to a width of respective said teeth within a given range.

* * * * *